United States Patent [19]

Nagano

[11] Patent Number: 5,168,377
[45] Date of Patent: Dec. 1, 1992

[54] SELF-RUNNING SCANNER FOR OPTICALLY READING IMAGES

[75] Inventor: Fumikazu Nagano, Yamatokouriyama, Japan

[73] Assignee: Sharp Kabushiki Kaisha, Osaka, Japan

[21] Appl. No.: 406,306

[22] Filed: Sep. 12, 1989

[30] Foreign Application Priority Data

Sep. 14, 1988 [JP] Japan .................. 63-230791

[51] Int. Cl.⁵ .................. H04N 1/40; H04N 1/04
[52] U.S. Cl. .................. 358/471; 358/474; 358/497
[58] Field of Search .......... 358/471, 474, 494, 497, 358/461, 464, 401

[56] References Cited

U.S. PATENT DOCUMENTS

| | | | |
|---|---|---|---|
| 4,439,790 | 3/1984 | Yoshida | 358/482 |
| 4,486,786 | 12/1984 | Sato et al. | 358/497 |
| 4,803,737 | 2/1989 | Sato et al. | 358/471 |
| 4,806,780 | 2/1989 | Yamamoto et al. | 358/461 |
| 4,870,502 | 9/1989 | Dreinhoff et al. | 358/474 |
| 4,882,631 | 11/1989 | Mine et al. | 358/471 |

FOREIGN PATENT DOCUMENTS

| | | |
|---|---|---|
| 257747 | 7/1987 | European Pat. Off. |
| 231646 | 8/1987 | European Pat. Off. |
| 3233232A1 | 9/1982 | Fed. Rep. of Germany |
| 3719553A1 | 6/1987 | Fed. Rep. of Germany |
| 58-111476 | 7/1983 | Japan |
| 61-232764 | 10/1986 | Japan |

OTHER PUBLICATIONS

European Search Report dated May 31, 1991.

*Primary Examiner*—Edward L. Coles, Sr.
*Assistant Examiner*—Thomas D. Lee
*Attorney, Agent, or Firm*—Birch, Stewart, Kolasch & Birch

[57] ABSTRACT

Provided is a self-running type scanner including a movable scanner unit and a running guiding and assisting plate mounting the scanner unit for guiding running of the scanner unit. The movable scanner unit includes an illuminating light source, a step motor for running the scanner unit, an image sensor, a controller for controlling provision of image information and running of the scanner unit, and wheels to which the rotation force of the motor is transmitted. The running assisting plate includes guides engaging with the wheels, a light transmitting area, a white area around the light transmitting area, a black area surrounding the white area and the light transmitting area, and timing marks indicative of the position for starting reading.

24 Claims, 8 Drawing Sheets

SELF-RUNNING SCANNER FOR OPTICALLY READING IMAGES

BACKGROUND OF THE INVENTION

1. Field of the Invention

The present invention relates to an image scanner and, more specifically, to an improvement of a scanner structured such that an object such as an original is fixedly placed and scanned by moving a scanner including an illuminating light source, a photodetector and the like to provide image information of the object.

2. Description of the Background Art

There has been a strong demand of treating image information in the same manner as in treating document information in various fields including the field of office automation. A scanner is one of the apparatuses provided to meet such a demand. The scanner is structured such that an object such as an original is illuminated by light from an illuminating light source and the light reflected from the object is detected by a one dimensional image sensor comprising CCDs (Charge Coupled Devices) to provide image information of the object. One type of such scanner is called a self-running type scanner in which an object such as an original is fixedly placed and a scanner portion is moved for scanning the object by using the light from the illuminating light source.

Figure 1:
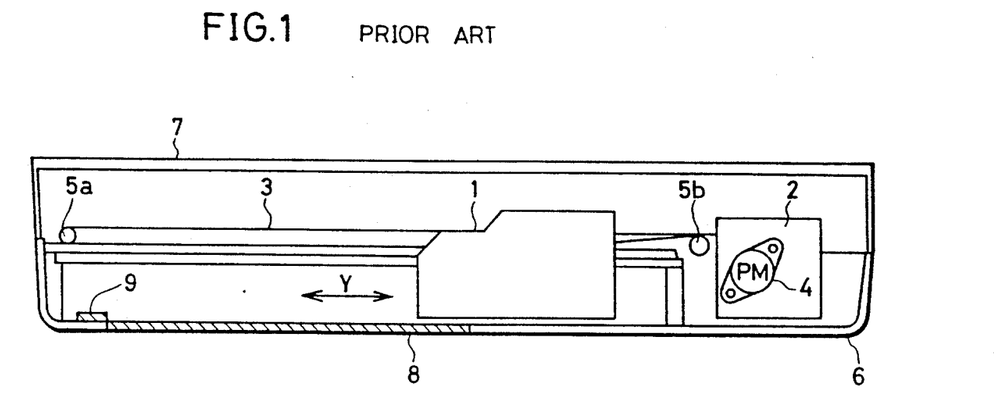
FIG. 1 schematically shows a whole structure of a conventional self-running type scanner.

FIG. 1 schematically shows a whole structure of a conventional self-running type scanner. Referring to FIG. 1, the conventional self-running type scanner comprises a scanner unit 1 for illuminating an object such as an original (not shown) with light having a prescribed wavelength and for detecting light reflected from the object to provide image information of the object, and a driving portion 2 for driving running of the scanner unit 1. The scanner unit 1 responds through a wire 3 to the rotation of a pulse motor 4 included in the driving portion 2, to be moved along the Y direction. The rotation of the pulse motor 4 included in the driving portion 2 is transmitted to the wire 3 through a pulley 5b. A pulley 5a is similarly provided at another portion of the wire 3 so as to smoothly move the scanner unit 1 along the Y direction. As the scanner unit 1 runs in the Y direction, the illuminating light from the illuminating light source included in the scanner unit 1 illuminates an object such as an original (hereinafter simply referred to as an object) while scanning the same, so that the desired image information of the object can be provided.

The scanner unit 1 and the driving portion 2 are contained in a scanner body 6. A scanner upper lid 7 is provided on the scanner body 6 for sealing the scanner unit 1, the driving portion 2 and so on, so as to prevent contamination due to dust and the like from outside.

A plate 8 formed of a transparent material for transmitting the illuminating light from the illuminating light source included in the scanner unit 1 and the light reflected from the object is provided at a prescribed region of the scanner body 6. The plate 8 is formed of a material such as acryl, glass or the like which is transparent to the illuminating light from the illuminating light source therethrough.

In addition, a white balance sheet 9 for providing a white level reference of the light reflected from the object is provided at a prescribed position of the scanner body 6. The scanner unit 1 scans the white balance sheet 9 to detect the light reflected from the white balance sheet 9. The detected level of the reflected light is used as the reference level to the white level of the light reflected from the, object during scanning. This is a measure to prevent an erroneous reading caused by a change in intensity of the reflected light associated with changes of the environment such as a change in intensity of the illuminating light from the light source.

Figure 2:
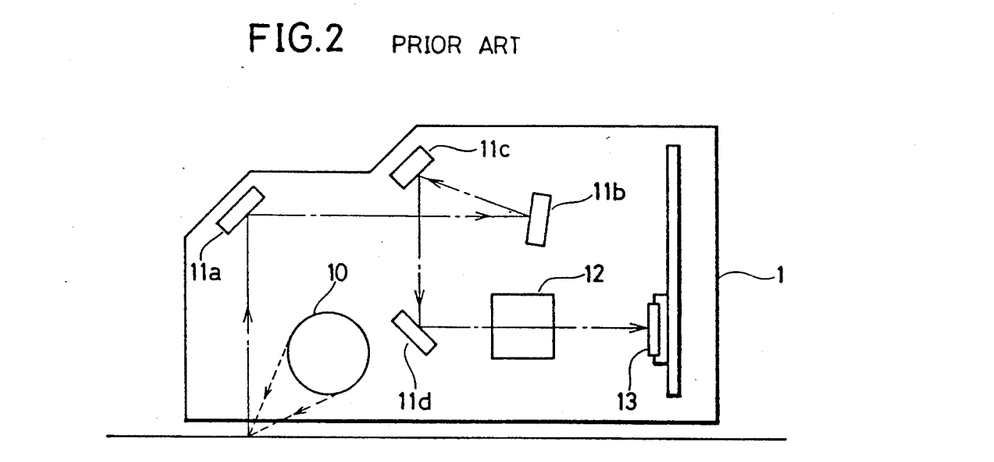
FIG. 2 schematically shows a structure of a scanner portion of the conventional self-running type scanner.

FIG. 2 schematically shows an internal structure of the scanner unit shown in FIG. 1. Referring to FIG. 2, the scanner unit comprises an illuminating light source 10 for illuminating an object, reflecting mirrors 11a, 11b, 11c and 11d reflecting the light reflected from the object (including the white balance sheet) and providing an optical path of the reflected light, and a lens 12 for receiving and focusing the reflected light from the reflecting mirror 11d onto a one dimensional image sensor 13 consisting of, for example, CCDs (Charge Coupled Devices). The one dimensional image sensor 13 converts the applied optical signals into electric signals to transmit the same to an image information processing apparatus through a path, not shown.

In the above described structure, when the scanner unit 1 scans the object along the Y direction, the scanning of the object in the X direction is carried out by the one dimensional image sensor 13. In such a self-running type scanner, the object is fixedly placed and illuminated by the light from the illuminating light source 10 and the illuminating light from the object is reflected by the reflecting mirrors 11a through 11d to be introduced to the one dimensional image sensor 13 through the lens 12 for image formation, so that the object can be scanned in both X and Y directions, providing desired image information of the object.

In the above described structure of the conventional self-running type scanner, the scanner unit 1 and the driving portion 2 for driving the running of the scanner unit 1 are separately provided, and the scanner unit 1, the driving portion 2 and the scanner driving wire 3 must be contained in a scanner body 6. In addition, the scanner body and the scanner upper lid are both of a separate type structure, so that the number of components of the units constituting the conventional self-running type scanner becomes large and the apparatus itself becomes complicated, preventing reduction in size of the apparatus. Since the apparatus comprises a large number of parts, it takes much time to assemble the self-running type scanner. The larger number of parts and the long time required for the assembly prevent provision of an inexpensive self-running type scanner.

A structure of a scanner unit having a rotary motor attached integrally thereto is disclosed in Japanese Patent Laying Open No. 61-232764. In this prior art, a flanged roller which is in contact with a guiding slide rod is arranged at a tip end portion of an output axis of the rotary motor, and a fixed axis having a V grooved bearing in contact with another slide rod is provided at a tip end of the other end of the unit. The scanner unit moves along the slide rods by the rotation of the output axis of the rotary motor.

A self-scanning type (self-running type) copying apparatus in which an original reading mechanism is moved by rotating a driving roller by means of a microstep motor is disclosed in Japanese Patent Laying Open No. 58-111476. In this copying apparatus, feeding of recording paper and the scanning of the original are both carried out by the driving of the same step motor.

No guiding means for moving the copying apparatus is provided in this prior art.

SUMMARY OF THE INVENTION

An object of the present invention is to provide an improved self-running type scanner eliminating drawbacks of the conventional self-running type scanner.

Another object of the present invention is to provide an inexpensive self-running type scanner having a simple structure with reduced number of parts.

A further object of the present invention is to provide a self-running type scanner having a simple structure which can read information exactly.

A self-running type scanner in accordance with the present invention comprises a scanner unit and a scanner driving portion formed integrally, and running assisting means for guiding and assisting the running of the scanner.

More specifically, the self-running type scanner of the present invention comprises a movable scanner portion including an illuminating light source, a photodetector for detecting reflected light, a running driving portion, and controlling means for controlling operation of the driving portion in accordance with the information detected by the photodetector, and means for guiding and assisting running of the scanner portion including means for guiding the running of the scanner portion and means indicative of a position at which reading of an object of the scanner portion starts.

Preferably, the guiding assisting means comprises a light transmitting area for defining an object reading area of the scanner portion and a white area for providing reference of white level in reading images of the object.

In the self-running type scanner of the present invention, scanner running driving means is integrally provided on the scanner portion, so that a simple structure can be realized, and accordingly, an inexpensive self-running type scanner can be provided as the number of parts and the steps for manufacturing can be reduced.

Running guiding means, the reading area defining area, means for indicating reading start position and the white area provided on the running assisting means enable accurate running of the scanner portion through the controlling means provided on the scanner portion and realize accurate reading of images.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B illustrate an advantage of a position for taking out a signal transmitting cable provided in the self-running type scanner in accordance with the present invention, in which

FIGS. 11A through 11E illustrate a reading operation of the self-running type scanner in accordance with one embodiment of the present invention showing waveforms of image sensor output signals, in which

DESCRIPTION OF THE PREFERRED EMBODIMENTS

Figure 3:
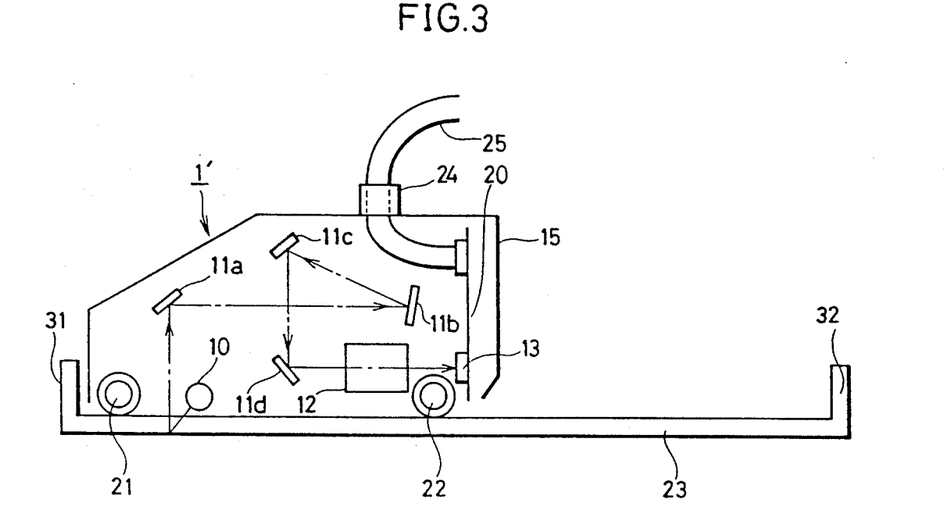
FIG. 3 schematically shows a whole structure of a self-running type scanner in accordance with one embodiment of the present invention.

FIG. 3 schematically shows a whole structure of the self-running type scanner in accordance with one embodiment of the present invention. Referring to FIG. 3, the self-running type scanner of one embodiment of the present invention comprises a scanner portion 1' for illuminating an object while scanning the same for providing image information of the object, and a running assisting plate 23 for guiding and assisting the running of the scanner portion 1'. The scanner portion 1' comprises an illuminating light source 10 for emitting light of a prescribed wavelength; reflecting mirrors 11a through 11d which reflect light reflected from objects (including an original and the like and the assisting plate 23) illuminated by the light emitted from the light source 10 for providing optical path of the reflected light; a lens 12 for condensing or converging light from the reflecting mirror 11d to form images on an image sensor 13; a one dimensional image sensor 13 for converting image information of the object applied through the lens 12 for into electric signals; and a controlling apparatus 20 receiving image information from the one dimensional image sensor 13 to provide desired image information and control the running of the scanner portion 1'.

The controlling apparatus 20 transmits signals to external apparatuses such as an image processing apparatus through a cable 25 and receives control signals such as an image information reading instructing signal from the external apparatuses. The cable 25 is taken outside from the scanner portion 1' through an upper cabinet projecting portion 24 provided on an upper portion of the upper cabinet 15 housing the scanner portion 1'. Front wheels 21 and rear wheels 22 for running and driving the scanner portion 1' are also provided. The control of the operation of the front and rear wheels 21 and 22 is carried out by the controlling apparatus 20.

The running assisting plate 23 comprises a front stopper 31 and a rear stopper 32 for preventing possible slippage of the scanner portion 1' from the running assisting plate 23 which may lead the scanner portion 1' to be dropped and damaged. The running assisting plate 23 serves not only to guide and assist the running of the scanner portion 1' but also to fixedly set the reading area for the scanner portion 1' to read image information of the object.

Figure 4:
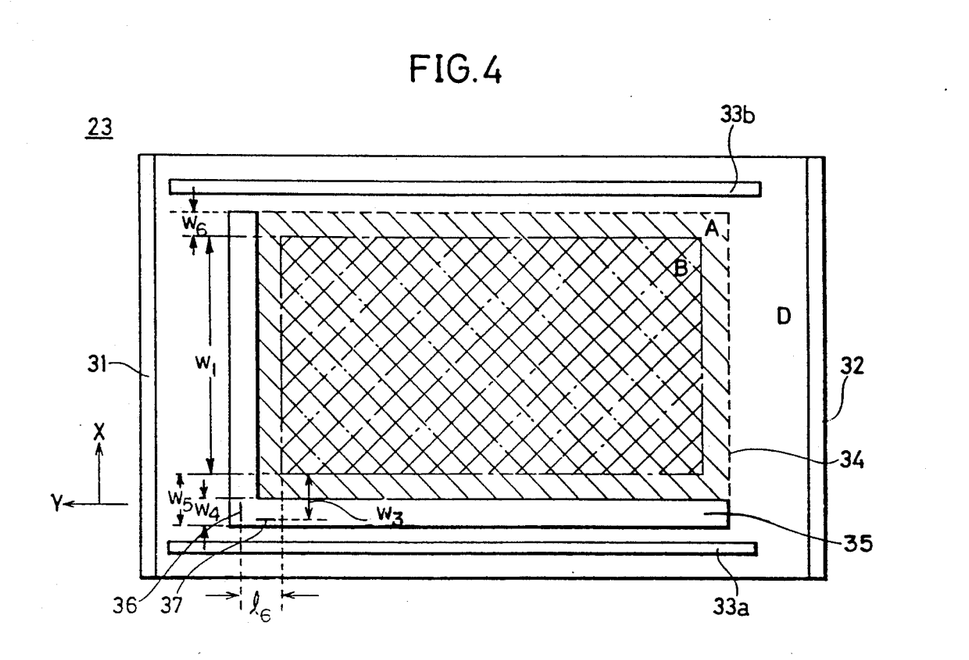
FIG. 4 shows a structure of a running assisting plate employed in the self-running type scanner in accordance with one embodiment of the present invention.

FIG. 4 shows more specific structure of the running assisting plate. Referring to FIG. 4, the running assisting plate 23 comprises front and rear stoppers 31 and 32, guiding areas 33a and 33b, and a light transmitting area 34.

The front and rear stoppers 31 and 32 are provided at the front portion and rear portion of the running assisting plate 23, respectively, along the direction of running (Y direction) of the scanner 1'.

The guiding areas 33a and 33b are respectively provided at prescribed positions on both sides of the running assisting plate 23 along the X direction. The front and rear wheels 21 and 22 provided on the scanner portion 1' engage with the guiding areas 33a and 33b. Consequently, the running of the scanner portion 1' is guided by the guiding areas 33a and 33b.

The light transmitting area 34 transmits illuminating light from the scanner portion 1' and the light reflected from the object, and it fixedly sets the reading area of the scanner portion 1'. The light transmitting area 34 is provided by cutting the running assisting plate 23 or by using a transparent material (acryl, glass or the like). The light transmitting area 34 (A) is larger than an effective reading area B (in which image information of the object is actually read) for reading the object, as shown in FIG. 4.

A white area 35 is provided along the X and Y directions of the light transmitting area 34 for applying a reference value of white level in reading images of the object and for giving information for moving the scanner portion 1' to the reading start position when the image reading of the object is to be started. Timing marks 36 and 37 each consisting of a black area having a width of 1 mm and a length of 2 mm are provided at prescribed positions of the white area 35. The timing marks 36 and 37 give information on reading start positions in the Y and X directions, respectively. The white area 35 has a width $w_4$ of 4 mm, for example, and it is formed to be larger than the length of the timing marks 36 and than the width of the timing mark 37, respectively. A black area D is provided around the outer periphery of the white region 35 so as to make clear the white level of the white area 35 and to prevent unnecessary reflection of light.

The shape of the guiding areas 33a and 33b is determined corresponding to to the shape of the front and rear wheels 21 and 22 provided on the scanner portion 1'. Alternatively, the shape of the front and rear wheels 21 and 22 is determined corresponding to the shape of the guiding areas 33a and 33b.

Figure 5A:
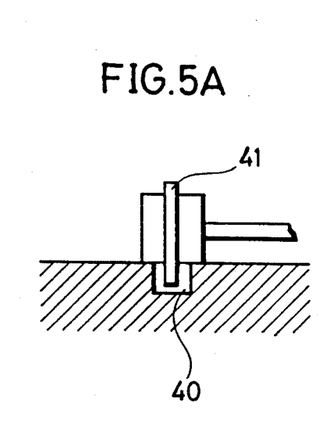
FIGS. 5A through 5C illustrate structures of wheels provided on the scanner portion and a structure of a guiding area provided on the running assisting plate employed in the self-running type scanner in accordance with one embodiment of the present invention.

As shown in FIG. 5A, if the guiding area 33 is formed of a guiding groove 40, the wheel provided on the scanner portion 1' (front and rear wheels) has a projecting portion 41 engaging with the guiding groove 40.

Figure 5B:
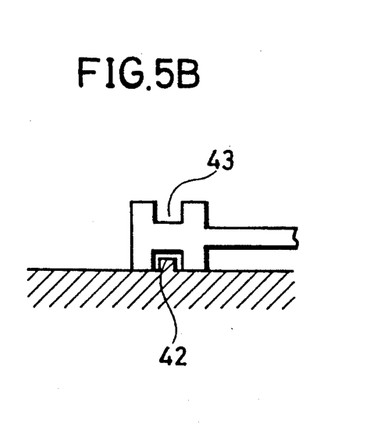

If the guiding area 33 is formed of a guiding projecting portion 42 as shown in FIG. 5B, the wheel (front and rear wheels) is structured to have a groove portion 43 engaging with the guiding projecting portion 42.

Figure 5C:
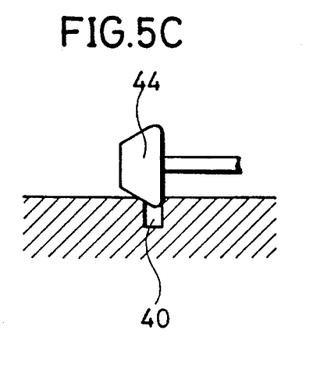

If the guiding area 33 is formed of a guiding groove 40 as shown in FIG. 5C, the wheel 44 having one side made parallel to the depth direction of the guiding groove 40 and the other side made oblique to the depth direction of the groove 40 may be used. In that case, a projecting portion defined by the parallel portion and the oblique portion of the wheel 44 is engaged with the guiding groove 40.

Figure 6:
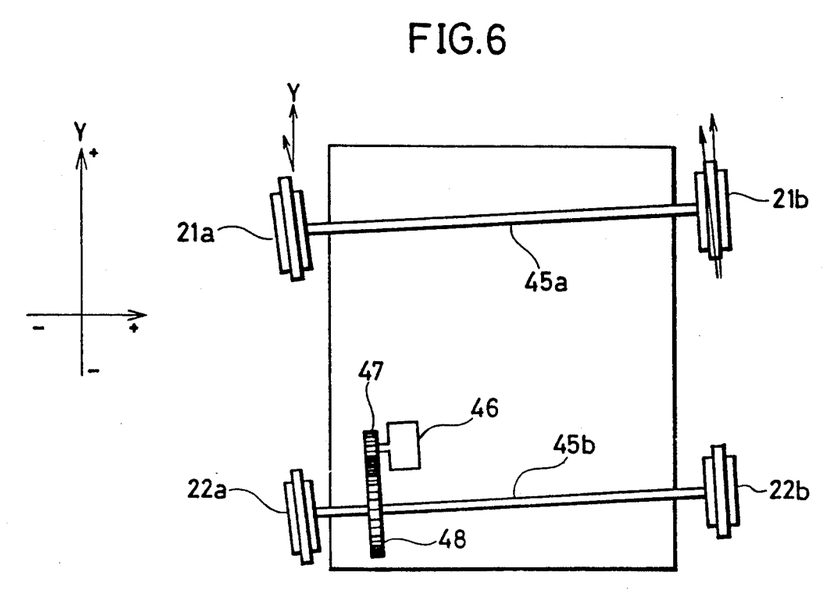
FIG. 6 shows an example of attachment of wheels of the self-running type scanner in accordance with one embodiment of the present invention.

The front and rear wheels 21 and 22 provided on the scanner portion 1' are attached to have a predetermined angle about the moving direction (Y) of the scanner portion 1', as shown in FIG. 6. Consequently, if the front and rear wheels 21 and 22 are both structured as shown in FIG. 5A and the guiding groove 33 is formed as the guiding groove 40, the front and rear wheels 21a, 21b, 22a and 22b run along and in contact with − (minus) side end portion of the guiding groove 40 in the X direction when the scanner portion 1' proceeds (+ direction in the Y direction), while the front and rear wheels 21a, 21b and 22a and 22b run along and in contact with + side end portion in the X direction of the guiding groove 40 when the scanner portion 1' moves rearward (− direction of Y direction shown in FIG. 6). Therefore, the stable running of the scanner portion 1' is achieved without skews such as fluctuation in the left and right direction and the unevenness in the running velocity. The front wheels 21a and 22b are supported by an axis 45a. The rear wheels 22a and 22b are supported an axis 45b. A first gear 48 is integrally provided with the axis 45b supporting the rear wheels 21a and 22b. A second gear 47 is provided to be engaged with the first gear 48. The second gear 47 is rotary driven by a pulse motor 46. Therefore, the rear wheels 22a and 22b are driven through the gears 47 and 48 in response to the rotation of the pulse motor 46, whereby the scanner portion 1' runs in the desired direction.

In association with the attachment of the wheels shown in FIG. 6, the scanner portion 1' can be moved in contact with one area of the guiding areas when the scanner portion 1' moves forward and rearward, by attaching the wheels at a prescribed angle about the direction of movement of the scanner portion 1', even when the wheels have the shape shown in FIG. 5B or 5C. Therefore, the scanner portion 1' can be moved without skew as in the above described case.

Figure 7A:
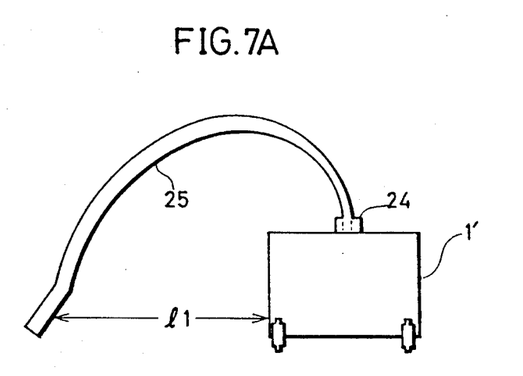
FIG. 7A shows a manner for taking out the cable in one embodiment of the present invention and FIG. 7B shows a structure for comparison.
Figure 7B:
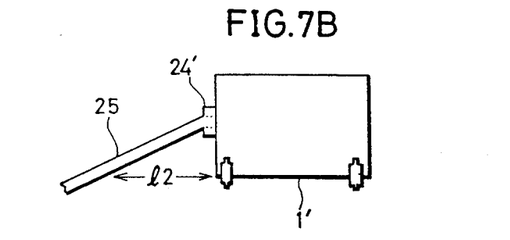

The cable 25 for exchanging signals with the control apparatus in the scanner portion 1' is taken out from a projecting area 24 provided on the upper portion, of an upper cabinet of the scanner portion 1' for the following reason. Namely, as is apparent from the comparison of FIGS. 7A and 7B, the distance l1 (FIG. 7A) required for connecting the cable 25 to another apparatus or to the running assisting plate when the cable is taken out from the projection 24 on the upper portion of the scanner portion 1' in this embodiment of the present invention can be made far longer than the distance 12 (FIG. 7B) required for connecting the cable 25 to an apparatus such as the running assisting plate when the cable 25 is taken out from the side portion of the scanner portion 1' through a taking area 24'. Consequently, undesirable influences to the running of the scanner portion 1' derived from friction of the cable 25 or the like can be removed, and therefore the scanner portion 1' can be moved more stably.

Figure 8:
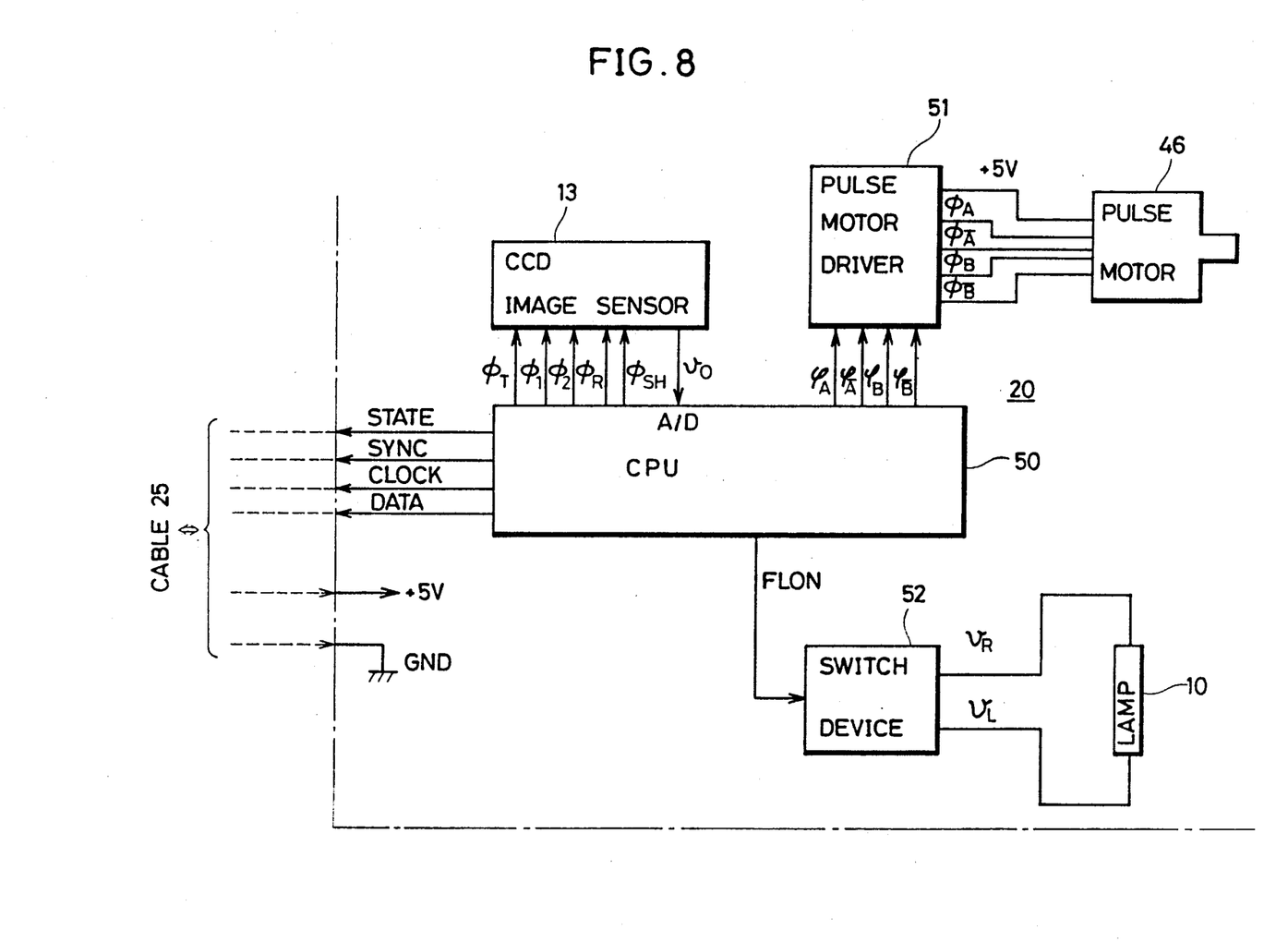
FIG. 8 is a block diagram showing an electric structure of the self-running type scanner in accordance with one embodiment of the present invention.
Figure 9:
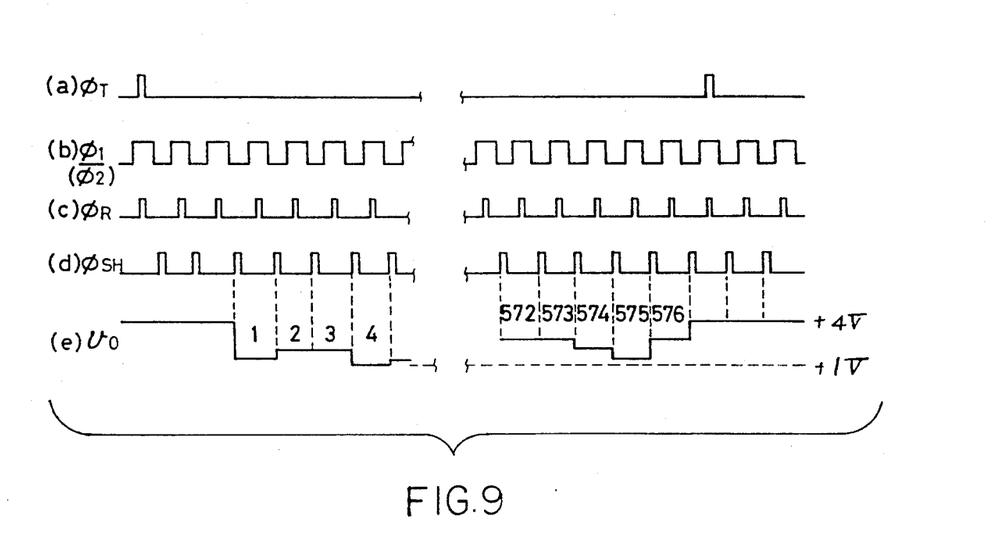
FIG. 9 is a diagram of waveforms showing relations between control signals applied to the image sensor and output signals.

FIG. 8 is a block diagram showing an electrical structure of the scanner portion in the self-running type scanner in accordance with one embodiment of the present invention. Referring to FIG. 9, portions corresponding the structure of FIG. 3 are designated by the same reference numerals.

Referring to FIG. 8, the scanner portion comprises a CPU 50 formed of one chip, for example, for controlling various operations of the scanner portion.

The CPU 50 outputs control signals $\phi_T$, $\phi_1$, $\phi_2$, $\phi_R$ and $\phi_{SH}$ for applying operation timing of the one dimensional image sensor 13 consisting of, for example, CCDs to the image sensor 13 and receives image information $v_0$ from the image sensor 13 at an A/D terminal thereof. The signal $\phi_T$ gives the timing for starting scanning of the image sensor 13. Namely, in response to the signal $\phi_T$, the information of the CCD cells in the image sensor 13 is transferred to an analog shift register (not shown). Clock signals $\phi_1$ and $\phi_2$ are two phase complementary clock signals which do not overlap with each other, applying data transfer timing in the analog shift register. Namely, the CCD cell information of the image sensor 13 is successively transmitted through the analog shift register in response to the clock signals $\phi_1$ and $\phi_2$. The signal $\phi_R$ applies data output timing of the image sensor 13. The information of the image sensor 13 is successively outputted in response to the signal $\phi_R$. The signal $\phi_{SH}$ is a signal for applying timing of sampling/holding the CCD cell information outputted in response to the signal $\phi_R$. Namely, each piece of information from the CCD cell is sampled/held in response to the signal $\phi_{SH}$ to be outputted as the output signal $v_0$ from the image sensor 13. The relation between timings of the control signals applied to the CCD image sensor 13 and the output signal from the image sensor 13 are shown in FIG. 9. FIG. 9 shows a case in which the image sensor 13 comprises 576 CCD cells, as an example.

The structure comprising 576 CCD cells is determined to satisfy the following conditions. Namely, assuming that the reading area (area B in FIG. 4) of the scanner portion has a width $w_1$ of 64 mm and a length of 100 mm, the image of the object is resolved with the resolution of ⅛ mm in Y and X directions, respectively, by the scanner portion. In order to read the white area 35 provided outside of the area B of FIG. 4, the CCD image sensor comprises $(64+8) \times 8 = 576$ CCD cells, so that an area wider than the effective reading width $w_1$ of 64 mm by 8 mm ($w_5 + w_6$) can be read.

Figure 10:
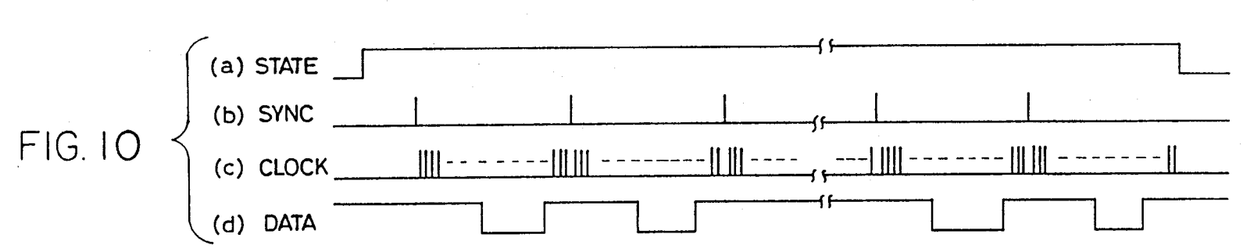
FIG. 10 is a diagram of waveforms showing relations between signals applied to external devices from a CPU employed in self-running type scanner in accordance with one embodiment of the present invention.

The CPU 50 receives +5 V through the cable 25 as the operational power supply. The CPU 50 outputs a STATE signal indicative of the reading of image information of the object, a signal SYNC indicative of the starting position of one line of the image information to be transmitted, the image information DATA from the CCD and the clock signal CLOCK for giving the data transmitting timing, in order to transmit the output from the image sensor 13 to external apparatuses (host computer, image processing apparatus and so on). The image information DATA outputted from the CPU 50 comprises only the image information of the object read in the effective reading area (the area B in FIG. 4), and not the image information of the white area 35 or the like provided on the running assisting plate 23. The timing relation between the signals outputted from the CPU 50 is shown in FIG. 10.

A pulse motor driver 51 for driving the pulse motor 46 is provided for driving the running of the scanner portion 1'. The pulse motor driver 51 receives motor rotation instructing signals $\phi_A$, $\phi_{-A}$, $\phi_B$, and $\phi_{-B}$ from the CPU 50, amplifies the level thereof to be sufficient for driving the pulse motor 46 and transmits control signals $\phi_A$, $\phi_{-A}$, $\phi_B$ and $\phi_{-B}$ as well as the supply voltage +5 V to the pulse motor 46. A two-phase-on type four phase pulse motor is used as the pulse motor 46, and it is stopped or rotated in either the negative direction or the positive direction by the combination of the signal levels of the control signals $\phi_A$, $\phi_{-A}$, $\phi_B$ and $\phi_{-B}$. The pulse motor 46 makes the scanner portion 1' run by ⅛ mm per 1 step in response to the control signal from the pulse motor driver 51.

A lighting apparatus 52 is provided for lighting the illuminating light source 10, which apparatus applies complementary high voltage signals $V_R$ and $V_L$ to the illuminating light source 10 in response to a lighting instructing signal FLON from the CPU 50. The illuminating light source 10 comprises, for example, a fluorescent lamp which is turned on by the application of the complementary lighting signals $V_R$ and $V_L$, which in turn sets the lamp in the same state as is connected to an alternating power supply.

Figure 13:
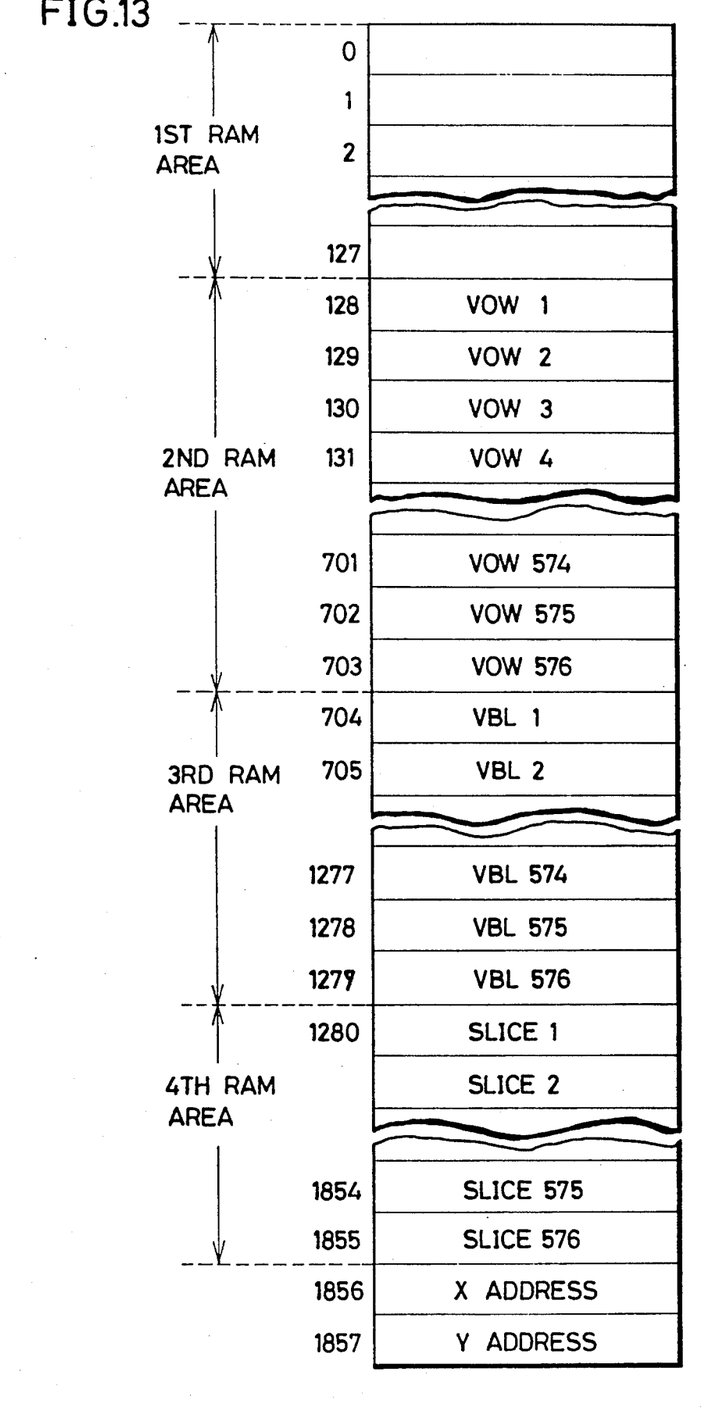
FIG. 13 shows a memory structure of a memory apparatus included in the CPU of the self-running type scanner in accordance with one embodiment of the present invention.

The CPU 50 has a memory device consisting of a RAM (Random Access Memory) as will be described later (see FIG. 13). The slice level which is the reference for determining whether the read image information is white or black is stored in the memory device, and the CPU determines whether the read image information is white or black dependent on the stored slice level and outputs the result as the output data DATA through the cable 25. The operation of the self-running type scanner in accordance with one embodiment of the present invention will be described in the following with reference to FIGS. 11 through 13.

The scanner portion 1' is set such that the reading line (the area illuminated by the light from the illuminating light source 10, and the reflected light from the object reaches the image sensor 13 to be read, that is, one line in the X direction in FIG. 4) is at an appropriate position of the light transmitting area 34 of the running assisting plate 23.

(1) When an object reading instruction is provided from an external apparatus, +5 V is applied through the cable 25 to the scanner unit 1', so that the CPU 50 starts its operation. In response to the application of +5 V, the CPU 50 resets to 0 in a second RAM area, that is, memory addresses 128 to 703 of the memory device included therein. At this time, the lighting instruction signal FLON is still in an inactive state, so that the lighting apparatus 52 does not operate and the illuminating light source 10 formed of a fluorescent lamp does not emit light.

(2) The CPU 50 applies various controlling signals to the image sensor 13 to read image information from the image sensor 13. The image sensor comprises 576 CCD cells and the CPU 50 receives CCD cell outputs from the first to 576th cells (the number of the CCD cells increases from the side of the white area 35 to the + direction in the X direction shown in FIG. 4) to A/D convert (analog-digital convert) the same. During A/D conversion, when the CCD cell output is 5 V, the CPU 50 sets the output to 255 and when the output is 0 V, the CPU 50 set the output to 0. The output value between 0 to 5 V is A/D converted stepwise, each step being about 19.6 mV. Namely, the range from 0 V to 5 V is divided into 256 levels, and the CCD cell output is represented by one of these levels. The 256 levels are represented in 8 bit binary number. Since the illuminating light source 10 does not emit light, the resultant 576 CCD cell outputs after the AD conversion are all at about 4 V, which corresponds to a black level. The black level data are stored in the memory addresses 704 to 1279 of a third RAM area of the memory device included in the CPU 50, as VBL1, VBL2, ... VBL576.

(3) After the black level data are stored in the memory device, the lighting instruction signal FLON is generated and the lighting apparatus 52 is activated to turn on the illuminating light source 10.

Figure 11A:
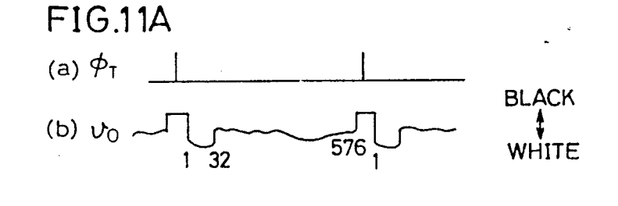
FIG. 11A shows a waveform of an image sensor output signal in the reading area before the start of actual reading operation.

(4) Thereafter, the CPU 50 checks the outputs from the first to 64th CCD cells out of the outputs from the image sensor 13. The white level (no more than 3 V) $w_4$ of about 4 mm in width corresponding to the white area 35 can be found in the outputs from the first to 64th CCD cells. Actually, the outputs from the first to 32nd CCD cells are at the white level as shown in FIG. 11A, for example. More specifically, $8 \times 4 = 32$ CCD cells exist in the white area having the width of about 4 mm, as the image sensor 13 has the resolution of 8/ mm in the X direction. Therefore, if the first CCD cell corresponds to the end portion of the white area, the outputs from the first to 32nd CCD cells will be the white level outputs.

(5) When the white level of the white area having a width of 4 mm is found, the CPU 50 determines that the scanner portion 1' is not positioned at the reading start position, and it outputs a control signal to the pulse motor driver 51 of the scanner portion 1' to drive the pulse motor 46, so that the scanner portion 1' is moved in the positive direction in the Y direction stepwise, each step $Y_1$ being ⅛ mm.

Figure 11B:
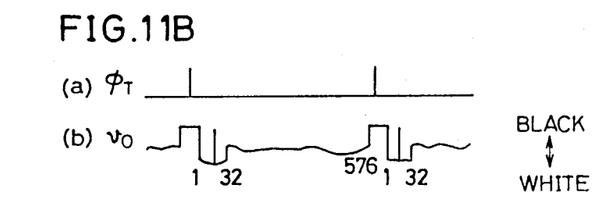
FIG. 11B shows a waveform of the image sensor output signal when the image sensor scans an X direction timing mark.

(6) As the scanner portion 1' runs, the X direction timing mark 37 is detected at a certain time point, and a black level (no less than 3.5 V) having the width, $Y_n$ about 1 mm appears as shown in FIG. 11B in the outputs from the first to 32nd CCD cells. After the detection of the X direction timing mark 37, the scanner portion 1' is further moved in the positive direction in the Y direction by the step of ⅛ mm. Consequently, the X direction timing mark 37 disappears and the white level of about 4 mm in width as shown in FIG. 11A is again found in the outputs from the first to 32nd CCD cells. The scanner portion 1' continues to run at the step of ⅛ mm.

Figure 11C:
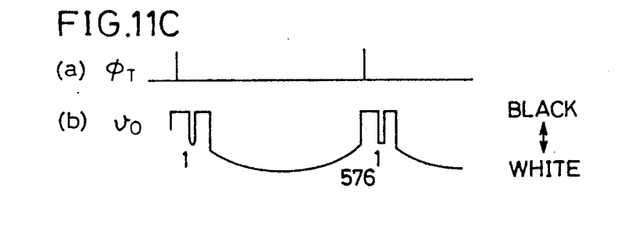
FIG. 11C shows a waveform of the output signal when the image sensor scans a Y direction timing mark.
Figure 11D:
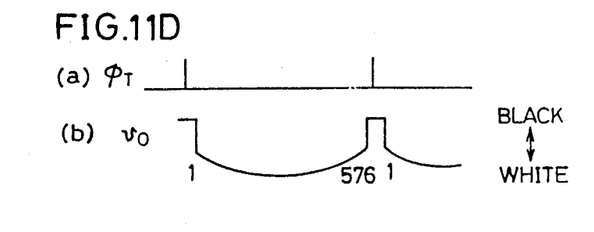
FIG. 11D shows the waveform of the output signal when the image sensor scans only the white area.
Figure 11E:
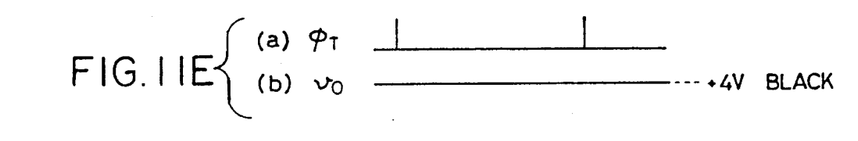
FIG. 11E shows the waveform of the output signal when the image sensor scans only the black area.

(7) As the scanner portion 1' runs, the image sensor 13 comes to scan the white area 35 extending in the X direction. Consequently, the outputs from the 576 CCD cells of the image sensor 13 all become white level, so that the output waveform as shown in FIG. 11D is applied to the CPU 50. In the present embodiment, the scanner portion 1' is further moved from this point to the + direction in the Y direction by 10 mm to be stopped there. Therefore, the area detected by the image sensor 13 corresponds to the black area D of the running assisting plate 23 (FIG. 11E).

(8) Thereafter, the scanner portion 1' starts running in the − direction of Y direction under the control of the CPU 50. When the Y direction timing mark 36 is scanned as the scanner portion runs, the black level having a width of about 2 mm is found in outputs from the first to 32nd CCD cells included in the image sensor 13. When the black level corresponding to the Y direction timing mark 36 is detected, the CPU 50 stops the running of the scanner portion 1'. The output signal of the image sensor 13 at this point have a waveform such as that shown in FIG. 11C.

(9) In response to the detection of the Y direction timing mark, the CPU 50 AD converts the outputs from the first to 576th CCD cells out of the CCD cell outputs from the image sensor 13, calculates average values with the signal levels which have been stored in the second RAM area of the memory device in the CPU 50, and again stores the average values to the original addresses. More specifically, assuming that the signal values of the CCD cells after AD conversion are VOW'1, VOW'2, ... VOW'575 and VOW'576, the signal values VOW1, VOW2, ... VOW576 which have been stored in the second RAM area are read to provide average output of each of the cells. Namely, the values (VOW1+VOW'1)/2, (VOW2+VOW'2)/2, ... (VOW576+VOW'576)/2 are calculated. The average values are written in the corresponding addresses from the memory address 128 to 703 as the new white level reference values VOW1, VOW2, ... VOW576. Since the Y direction timing mark 36 has been detected, there is an output signal indicative of the black level out of the output signals from the first to 32nd CCD cells. However, only the 65th to 576th CCD cell outputs are used as the information from the effective area for reading images of the object, that level has no influence on the actual reading of the image information of the object.

(10) Thereafter, the scanner portion 1' runs in the − direction in the Y direction only by a step of ⅛ mm under the control of the CPU 50. The waveform v0 of the output signal from the image sensor 13 at this time point is shown in FIG. 11c as in the above described case, since the width of the Y direction timing mark 36 is about 1 mm shown as $Y_n$. The CCD cell outputs from the image sensor 13 are AD converted in a similar manner as described above, and the respective numerical values are provided as VOW1'', VOW'' 2, ... VOW1'' 575 and VOW'' 576. The average value between them and the white level reference values VOW1, VOW2, ... VOW3 ... VOW576 which have been calculated by the previous averaging operation are calculated. The values provided in this manner are stored as the new reference level values VOW1, VOW2, ... VOW576 in the memory addresses 128 to 703 in the second RAM area of the memory device in the CPU 50.

Figure 12:
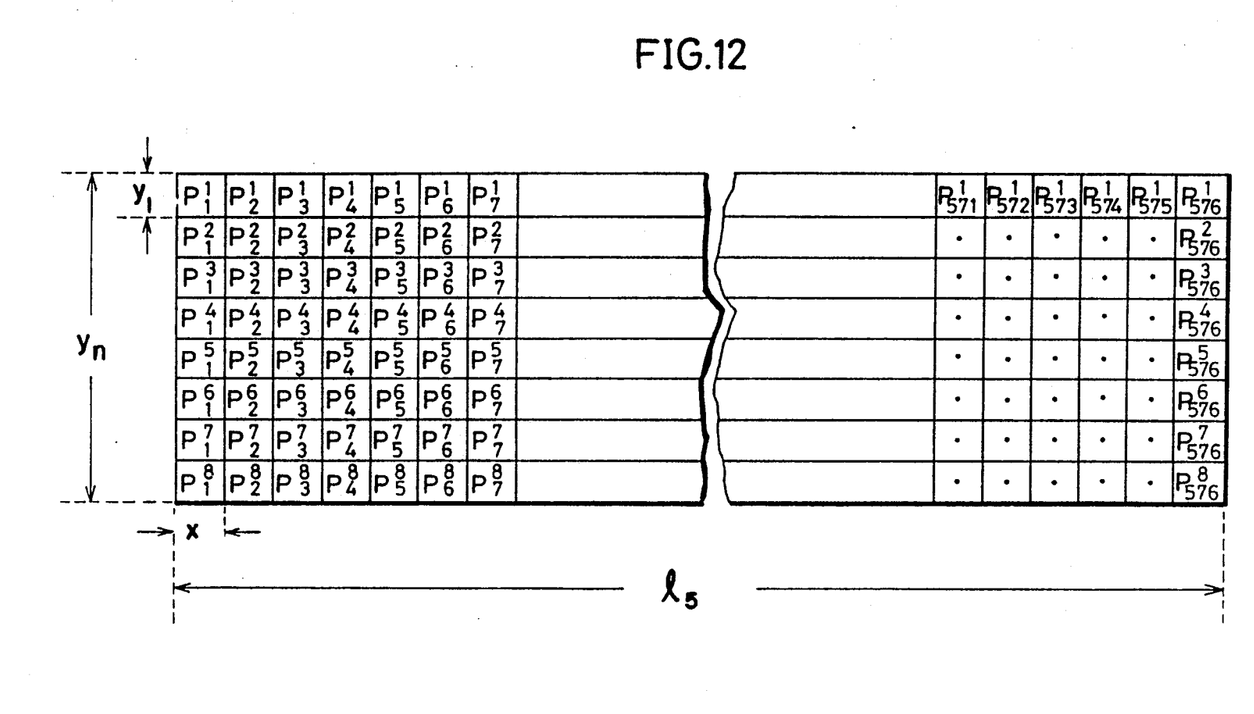
FIG. 12 shows a method for obtaining a slice level of the image sensor output showing, as an example, a method for obtaining a slice level by scanning 8 lines and by providing white level using an average value of the lines.

(11) The above described operation is repeated for the entire Y direction timing mark (8 lines, 1 mm in width). Consequently, the reference values V01, V02, VOW3, ... VOW575 and VOW 576 stored in the second RAM area of the memory addresses 128 to 703 in the memory device of the CPU 50 represent the average values of the levels in a rectangular area having the width of 1 mm and the length 15 of 72 mm, which corresponds to the Y direction timing mark 36 in the white area having the width of 4 mm extending in the Y direction shown in FIG. 4. Out of these, the outputs from the 65th to the 576th CCD cells are used as the CCD cell outputs corresponding to the length of 64 mm of the reading area. Since only the white levels are detected in this area, the average value of the white level in this area is used as the white level reference value in the actual reading of the image of the object. Namely, as shown in FIG. 12, the output from the first CCD cell in 8 times of scanning of the white area, that is, P'1, P²1, ... P⁸1 is averaged and the average value is stored in the memory address 128 as the value VOW1. Similarly, the average value VOW2 of the outputs P'2, P²2, ... P⁸2 from the second CCD cell is stored in the memory address 129. The average value VOW512 of the outputs P'576, P²576, ... P⁸576 from the 576th CCD cell is stored in the memory address 703.

The average value of the CCD cell outputs over several lines (8 lines in the embodiment) is used as the reference value of the white level in order to reduce the influence of dust, unevenness of color and the like.

(13) Thereafter, the CPU 50 provides a slice level which becomes the reference for determining white or black in detecting image information, by using the stored reference values VOWi and VBLi. The slice level is calculated in the following manner.

$$SLICE\ (N) = [VOW\ (N) - VBL\ (N)] \times 0.7 + 0\ VBL\ (N)$$

where $N = 1, 2, 3, \ldots 576$

The calculated slice levels are respectively stored in a fourth RAM area, i.e., the memory addresses 1280 to 1855 of the memory device.

(14) Thereafter, the scanner portion 1' runs in the − direction of the Y direction to a point where the waveform of the output signal from the image sensor 13 changes from that of FIG. 11C to that of FIG. 11D, under the control of the CPU 50. The fact that the CCD cell output from the image sensor 13 has such a waveform as shown FIG. 11D means that the areas scanned by the image sensor 13 are all white areas. When the scanning areas of the image sensor 13 all become white, the CPU 50 clears the Y address in the memory address 1857 of the memory device to "0" in response. Thereafter, as the scanner portion 1' runs in the negative direction in the Y direction by ⅛ mm, the CPU 50 increments Y address of the memory address 18577 by "1".

(15) The scanner portion 1' continues to run, and when the waveform of the output signal from the image sensor 13 changes from that shown in FIG. 11D to that shown in FIG. 11B, it means that the image sensor scans the X direction timing mark 37. The CPU 50 stores as the X address in the memory address 1856 of the memory device, the number value of the CCD cell having the largest number outputting black label (no less than 3.5 V) out of the first to 32nd CCD cells of the image sensor 13. Now, if the 9th CCD cell to 16th CCD cell provide black level, the value to be stored in the memory address 1856 is 16, for example.

(16) When the scanner portion 1' continues to run and the value of the Y address becomes 81 (the scanning portion ran by 10 mm shown at 16 Y direction timing mark 36 and the effective reading area B is the scanning area of the image sensor 13), the CPU 50 sets the signal STATE to an active state, that is, "1", which signal indicates that the image reading operation is being carried out. At the same time, the CPU 50 outputs the signal SYNC indicative of the start of 1 line of the data, the clock signal CLOCK giving the transferring timing of the data, and the data DATA read from the image sensor 13 through the cable 25.

The image data DATA outputted from the CPU will be described. Each of the output data from (X address+33) = 49th CCD cell to the (49+512−1) = 560th CCD cell is compared with the respective ones of the slice levels SLICE 49 to SLICE 560 stored in the fourth RAM area of the CPU 50. Whether it is black or white is determined dependent on the result of comparison, and the values corresponding to the results of comparison are outputted as the data signals DATA. Namely, if the CCD cell output is larger than the slice level and it is dark, the value "1" is outputted, and if the output is smaller than the slice level and it is near white, the value "0" is outputted. In this manner, image information provided from 512 CCD cell outputs corresponding to the effective reading area are outputted. The position where the effective reading area is terminated can be detected by monitoring the Y address.

In the above described embodiment, all of the 576 CCD cell outputs are used in detecting the white level for providing the slice level. Alternatively, the outputs from the CCD cells in the area from which the white level is surely detected may be used.

In any case, by providing the slice level using the CCD cell outputs in the range larger than the effective reading area (the area B in FIG. 4), whether the image information of the object is white or black can be surely and reliably determined.

As described above, according to the present invention, the scanner portion and a driving portion for driving the scanner portion are integrally provided in a self-running type scanner, so that the number of parts as well as the time required for the assembly can be reduced, enabling provision of an inexpensive self-running type scanner capable of surely providing image information.

Since an Y direction timing mark and a X direction timing mark are provided on a running assisting plate, it is adapted such that the position for starting actual image reading of the object is determined in accordance with the timing marks and the data of several lines in a white area provided on the running assisting plate are used to provide reference for determining whether the read information of the object is white or black, influences of an unevenness in color in the white area, the dust, degradation of illuminating light source and the like can be removed and the image information of the object can be surely provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-running scanner for optically reading information from an original document, comprising:
   a movable scanner; and
   running assisting means for supporting and assisting running of said movable scanner;
   said movable scanner running on said running assisting means and including
   an illuminating light source emitting light to the original document,
   means for detecting illuminating light from said illuminating light source reflected by said original document and providing image information of said original document, and
   means integrally provided with said movable scanner for driving running of said scanner;

said running assisting means being positioned over said original document and under said movable scanner and including means, positioned within an upper surface of said running assisting means, for guiding running of said movable scanner, said movable scanner running along said means for guiding, a light transmitting area provided within said running assisting means for transmitting illuminating light from said illuminating light source and the light reflected from said original document, said light transmitting area having a first side along the direction of running of said movable scanner and a second side along a direction intersecting said direction of running, a white area arranged adjacent said first and second sides of the light transmitting area, for reflecting light from said illuminating light source for providing a reference level of white level in reading images of said original document, a black area provided along an outer periphery of said white area for absorbing illuminating light from said illuminating light source, and means, provided at a prescribed position on said running assisting means, for indicating a position for starting reading image information of said original document by said movable scanner.

2. The self-running scanner according to claim 1, wherein said movable scanner comprises at least a pair of front wheels and a pair of rear wheels engaging with said means for guiding, rotation from said driving means being transmitted to at least one of said front and rear wheels, said front and rear wheels mounted rotatably on said movable scanner to make a prescribed oblique angle with a direction of running of said movable scanner.

3. The self-running scanner according to claim 1, wherein said light transmitting area comprises an effective reading area defining an actual area for reading information of said original document, and a redundant reading area provided along an outer periphery of said effective reading area.

4. The self-running scanner according to claim 1, wherein said means for indicating a position for starting reading is formed by a black area provided on a prescribed position of said white area.

5. The self-running type scanner according to claim 4, wherein said black area for indicating the position for starting reading comprises a strip-shaped first black area extending in parallel to said first side of said light transmitting area, and a second strip-shaped black area extending in parallel with the second side of said light transmitting area.

6. The self-running scanner according to claim 1, wherein said image information providing means comprises photoelectric converting means for converting an applied optical signal into an electric signal, and controlling means for controlling operation of said photoelectric converting means and lighting operation of said illuminating light source, said controlling means having a first memory area for storing a reference value of a black level in reading information of said original document, a second memory area for storing a reference value of a white level in reading information of said original document, a third memory area for storing a white/black determining reference value in reading information of said original document provided based on the reference values respectively stored in said first and second memory areas, and a fourth memory area for storing information in association with a position for reading information of said original document based on the signal from said means for indicating a position for starting reading image information of said original document.

7. The self-running scanner according to claim 1, wherein said image information providing means comprises photoelectric converting means for converting an applied optical signal to an electric signal, and controlling means for controlling operations of said photoelectric converting means, said driving means and said illuminating light source, said controlling means including a first memory area for storing an output from said photoelectric converting means before lighting of said illuminating light source as a black level reference value, a second memory area for storing an output from said photoelectric converting means during scanning of said white area along said second side with said illuminating light source being on as a white level reference value, a third memory area for storing a white/black determination reference value in reading information of said original document provided based on the reference values stored in said first and second memory areas, and a fourth memory area responsive to a signal from said means for indicating a position for starting reading image information of said original document for storing information of a scanning position of said original document.

8. The self-running scanner according to claim 7, wherein said reading starting position instructing means comprises a first strip-shaped black mark provided on said white area along said first side, and a second strip-shaped black mark provided on said white area along said second side;

said controlling means comprises first means responsive to the reading information signal for writing an output from said photoelectric converting means to said first memory area before turning on of said illuminating light source, second means responsive to a signal indicative of a detection of said second mark after the turning on of said illuminating light source for writing the output from said photoelectric converting means to said second memory area, third means for carrying out a predetermined arithmetic operation on data stored in said first and second memory areas to provide said white/black determination reference value and for writing the provided determination reference value to said third memory area, fourth means for detecting a transition between detection to non-detection of said second mark and for writing information of the information reading start position of said original document based on the detected information of the position of transition to a first portion of said fourth memory area, fifth means responsive to a signal indicative of a detection of said first mark for providing position information defining an effective reading area in which reading of information of said original document is actually carried out and for writing the position information to a second portion of said fourth memory area, and means for comparing an output from said photoelectric converting means provided by scanning said original document with the determination reference values stored in said third memory area, based on the position information stored in said fourth memory area, and for outputting read information of said original document based on the result of a comparison by said means for comparing.

9. The self-running scanner according to claim 8, wherein said second mark is wide enough to permit a plurality of scanning by said photoelectric converting means, and said second writing means comprises means for calculating an average between an output from said photoelectric converting means and data stored in said second memory area in response to the signal indicative of the detection of said second mark and for writing the average value data to said memory area.

10. The self-running type scanner according to claim 8, wherein said driving means comprises a step motor rotating in response to a pulse signal, said fourth means comprises means for clearing the first portion of said fourth memory area in response to the detection of said transition and for incrementing content in the first portion of said fourth memory area every step of said step motor, and third controlling means further comprises means for generating a signal indicative of a start of information reading of said original document when the content of said first portion of said fourth memory area reaches a predetermined value.

11. The self-running type scanner according to claim 8, wherein said first mark and said effective reading area are spaced apart by a prescribed distance from each other, and said output means comprises means for processing only those outputs from said photoelectric converting means which correspond to said effective reading area to output the same as the read information, based on the position information stored in the second portion of said fourth memory area.

12. The self-running scanner according to claim 7, wherein said photoelectric converting means comprises an array of charge coupled devices arranged in one dimension, said array of charge coupled devices being long enough to simultaneously scan both said white area and said light transmitting area, a length and width of said first and second marks being selected to permit a plurality times of scanning by said array of charge coupled devices, and the width and length of said first and second marks being selected to permit simultaneous canning by a plurality of charge coupled devices.

13. A self-running scanner for optically reading information from an original document, comprising:

a movable scanner; and a running assisting plate placed on top of the original document;

said movable scanner running on said running assisting plate and including an illuminating light source emitting source to the original document, means for detecting illuminating light from said illuminating light source reflected by the original document and for providing image information of the original document, and means integrally provided with said movable scanner for driving running of said scanner, said running assisting plate being positioned over the original document and under said movable scanner and including a light transmitting area for transmitting illuminating light from said illuminating light source and the light reflected from the original document, wherein said light transmitting area includes a first side along a direction of running of said movable scanner and a second side along a direction intersecting said direction of running, a white area arranged adjacent said first and second sides of the light transmitting area, for reflecting light from said illuminating light source for providing a reference level of white level in reading images of said original document, a black area provided along an outer periphery of said white area for absorbing illuminating light from said illuminating light source, and means positioned within an upper surface of said running assisting means, for guiding running of said movable scanner, said movable scanner running along said means for guiding.

14. The self-running scanner according to claim 13, wherein said movable scanner comprises at least a pair of front wheels and a pair of rear wheels engaging with said means for guiding, rotation from said driving means being transmitted to at least one of said front and rear wheels, said front and rear wheels mounted rotatably on said movable scanner to make a prescribed oblique angle with a direction of running of said movable scanner.

15. The self-running scanner according to claim 13, wherein said light transmitting area comprises an effective reading area defining an actual area for reading information of said original document, and a redundant reading area provided along an outer periphery of said effective reading area.

16. The self-running scanner according to claim 13, further including means for indicating a position for starting reading formed by a black area provided on a prescribed position of said white area.

17. The self-running scanner according to claim 16, wherein said black area for indicating the position for starting reading comprises a strip-shaped first black area extending in parallel to said first side of said light transmitting area, and a second strip-shaped black area extending in parallel with the second side of said light transmitting area.

18. The self-running scanner according to claim 13, further including means for indicating a position for starting reading image information of said original document by said movable scanner and wherein, said image information providing means comprises
photoelectric converting means for converting an applied optical signal into an electric signal, and
controlling means for controlling operation of said photoelectric converting means and lighting operation of said illuminating light source,
said controlling means having
a first memory area for storing a reference value of a black level in reading information of said original document,
a second memory area for storing a reference value of a white level in reading information of said original document,
a third memory area for storing a white/black determining reference value in reading information of said original document provided based on the reference values respectively stored in said first and second memory areas, and
a fourth memory area for storing information in association with a position for reading information of said original document based on signal from said means for indicating a position for starting reading image information of said original document.

19. The self-running scanner according to claim 13, further including means for indicating a position starting reading image information of said original document by said movable scanner and wherein said image information providing means comprises photoelectric converting means for converting an applied optical signal to an electric signal, and
controlling means for controlling operations of said photoelectric converting means, said driving means and said illuminating light source, said controlling means including
a first memory area for storing an output from said photoelectric converting means before lighting of said illuminating light source as a black level reference value,
a second memory area for storing an output from said photoelectric converting means during scanning of said white area along said second side with said illuminating light source being on as a white level reference value,
a third memory area for storing a white/black determination reference value in reading information of said original document provided based on the reference values stored in said first and second memory areas, and
a fourth memory area, responsive to a signal from said means for indicating a position for starting reading image information of said original document, for storing information of a scanning position of said original document.

20. The self-running scanner according to claim 19, wherein said reading starting position indicating means comprises a first strip-shaped black mark provided on said white area along said first side, and
a second strip-shaped black mark provided on said white area along said second side;
said controlling means comprises
first means responsive to the reading instructing signal for writing an output from said photoelectric converting means to said first memory area before turning on of said illuminating light source,
second means responsive to a signal indicative of a detection of said second mark after the turning on of said illuminating light source for writing the output from said photoelectric converting means to said second memory area,
third means for carrying out a predetermined arithmetic operation on data stored in said first and a second memory areas to provide said white/black determination reference value and for writing the provided determination reference value to said third memory area,
fourth means for detecting a transition between detection to non-detection of said mark and for writing information of the information reading start position of said original document based on the detected information of the position of transition to a first portion of said fourth memory area,
fifth means responsive to a signal indicative of a detection of said first mark for providing position information defining an effective reading area in which reading of information of said original document is actually carried out and for writing the position information to a second portion of said fourth memory area, and
means for comparing an output from said photoelectric converting means provided by scanning said original document with the determination reference values stored in said third memory area, based on the position information stored in said fourth memory area, and for outputting read information of said original document based on the result of a comparison by said means for comparing.

21. The self-running scanner according to claim 20, wherein
said second mark is wide enough to permit a plurality of scanning by said photoelectric converting means, and
said second writing means comprises means for calculating an average between an output from said photoelectric converting means and data stored in said second memory area in response to the signal indicative of the detection of said second mark and for writing the average value data to said memory area.

22. The self-running scanner according to claim 20, wherein said driving means comprises a step motor rotating in response to a pulse signal,
said fourth means comprises means for clearing the first portion of said fourth memory area in response to the detection of said transition and for incrementing content in the first portion of said fourth memory area every step of said step motor, and
third controlling means further comprises means for generating a signal indicative of a start of information reading of said original document when the content of said first portion of said fourth memory area reaches a predetermined value.

23. The self-running scanner according to claim 20, wherein
said first mark and said effective reading area are spaced apart by a prescribed distance from each other, and
said output means compares means for processing only those outputs from said photoelectric converting means which correspond to said effective reading area to output the same as the read information, based on the position information stored in the second portion of said fourth memory area.

24. The self-running scanner according to claim 19, wherein said photoelectric converting means comprises an array of charge coupled devices arranged in one dimension, said array of charge coupled devices being long enough to simultaneously scan both said white area and said light transmitting area, a length and width of said first and second marks being selected to permit a plurality times of scanning by said array of charge coupled devices, and the width and length of said first and second marks being selected to permit simultaneous scanning by a plurality of charge coupled devices.

* * * * *